United States Patent
Stoff

(10) Patent No.: US 11,981,358 B2
(45) Date of Patent: May 14, 2024

(54) ARRANGEMENT FOR POSITIONING A TRANSFORMER IN A RAIL VEHICLE

(71) Applicant: Siemens Mobility GmbH, Munich (DE)

(72) Inventor: Helmut Stoff, Warngau (DE)

(73) Assignee: Siemens Mobility GmbH, Munich (DE)

( * ) Notice: Subject to any disclaimer, the term of this patent is extended or adjusted under 35 U.S.C. 154(b) by 794 days.

(21) Appl. No.: 17/055,654

(22) PCT Filed: Apr. 25, 2019

(86) PCT No.: PCT/EP2019/060670
§ 371 (c)(1),
(2) Date: Nov. 16, 2020

(87) PCT Pub. No.: WO2019/219347
PCT Pub. Date: Nov. 21, 2019

(65) Prior Publication Data
US 2021/0229709 A1    Jul. 29, 2021

(30) Foreign Application Priority Data

May 15, 2018    (DE) .......................... 102018207473
Jul. 17, 2018    (DE) .......................... 102018211861

(51) Int. Cl.
*B61C 3/00*     (2006.01)
*B61C 17/00*    (2006.01)
*B61F 1/00*     (2006.01)

(52) U.S. Cl.
CPC ............... *B61C 3/00* (2013.01); *B61C 17/00* (2013.01); *B61F 1/00* (2013.01)

(58) Field of Classification Search
CPC ........... B61C 3/00; B61C 17/00; B61C 17/04; B61C 17/06; B61F 1/00; B61F 1/06; B61F 1/08; B61F 1/14
See application file for complete search history.

(56) References Cited

U.S. PATENT DOCUMENTS

2013/0180429 A1    7/2013    Schwiegel et al.

FOREIGN PATENT DOCUMENTS

| CN | 103118920 A | 5/2013 |
|----|-------------|--------|
| CN | 104482048 A | 4/2015 |
| CN | 104527691 A | 4/2015 |
| CN | 104772653 A | 7/2015 |

(Continued)

OTHER PUBLICATIONS

Chen Ziyin: "Structural Principle and Application of CNC Machine Tools", 3rd Edition, 2017, pp. 133-135—English abstract.

*Primary Examiner* — Robert J McCarry, Jr.
(74) *Attorney, Agent, or Firm* — Laurence A. Greenberg; Werner H. Stemer; Ralph E. Locher

(57) ABSTRACT

An arrangement for positioning a transformer in a rail vehicle, where the rail vehicle has a transformer support which fastens the transformer at a predetermined position in the rail vehicle. The transformer support is arranged on an underframe of the rail vehicle. The transformer is connected to the transformer support via a sliding guide, wherein a positional change of the transformer relative to the underframe of the rail vehicle can be set by way of the sliding guide. The sliding guide is a hydrostatic sliding guide.

6 Claims, 6 Drawing Sheets

(56) References Cited

FOREIGN PATENT DOCUMENTS

| | | | | |
|---|---|---|---|---|
| CN | 204926089 | A | 12/2015 | |
| CN | 205218544 | U | 5/2016 | |
| CN | 106080623 | A * | 11/2016 | ............. B61C 17/00 |
| CN | 106080623 | A | 11/2016 | |
| CN | 206984741 | U | 2/2018 | |
| DE | 102014113829 | A1 | 3/2016 | |
| JP | 2007182208 | A | 7/2007 | |
| TW | 201100662 | A | 1/2011 | |

* cited by examiner

ARRANGEMENT FOR POSITIONING A TRANSFORMER IN A RAIL VEHICLE

BACKGROUND OF THE INVENTION

Field of the Invention

The invention relates to an arrangement for positioning a transformer in a rail vehicle, as is described for example in the parallel application with the file reference DE 102018207473.9 and with the filing date of May, 15, 2018.

According to the embodiments described therein, rail vehicles (for example electric locomotives and diesel locomotives) have to be very precisely balanced in terms of their weight distribution in order to avoid relatively large axle load differences and wheel load differences. In order to achieve this, the design and the distribution of the components of the locomotives are conventionally already chosen during construction such that a predetermined center of gravity is achieved as centrally as possible in the rail vehicle.

After the assembly of the locomotive, deviations in the position of the center of gravity in the longitudinal direction of the rail vehicle (referred to hereinafter as x direction) or transversely to the longitudinal direction of the rail vehicle (referred to hereinafter as y direction) can be compensated for by means of additionally added ballast weights. This is less than optimal with regard to the permissible overall weight of the rail vehicle.

In order to avoid this problem, the use of a transformer support has been proposed. This transformer support is arranged on the underframe of the rail vehicle, in particular between the bogies, and holds the transformer at a position in the rail vehicle. The transformer support is designed in such a way that the position of the transformer relative to the underframe of the rail vehicle can be more precisely set in an assembly phase. This ensures that a predetermined center of gravity position is set or realized by a precisely settable position of the transformer in the rail vehicle.

In practice, it is appropriate for the settable transformer support to be assembled in the rail vehicle in a first assembly step without transformer and for the required, predetermined position of the transformer to be precisely set by way of the transformer support. In a second assembly step, the transformer is then fixed on the support such that it is arranged in the desired position in the rail vehicle.

In the case of rail vehicles, such as for example, electric locomotives, the transformer usually has a weight of approximately 15% of the mass of the rail vehicle. A transformer can therefore have a weight of up to 15 tons. This high weight hampers or prevents a further positional change of the transformer desired after the second assembly step in order for example to carry out further optimization or fine tuning at the center of gravity of the rail vehicle.

SUMMARY OF THE INVENTION

It is therefore the object of the present invention to specify an arrangement for variably positioning a transformer in a rail vehicle whereby a positional change of the transformer is allowed after assembly in the rail vehicle.

This object is achieved by the features as claimed. Advantageous developments are specified in the dependent claims.

The invention relates to an arrangement for positioning a transformer in a rail vehicle. The rail vehicle has a transformer support which fastens the transformer at a predetermined position in the rail vehicle. The transformer support is arranged on an underframe of the rail vehicle. The transformer is connected to the transformer support by way of a guide, wherein a positional change of the transformer relative to the underframe of the rail vehicle can be set by means of the guide. The guide is a sliding guide which is preferably designed as a hydrostatic or as an aerostatic sliding guide.

In a preferred development, the sliding guide is a linear guide in which associated guide elements are not separated by means of rolling bodies.

An aerostatic sliding guide denotes a guide (with a bearing) having an active compressed air circuit. The compressed air circuit is preferably maintained via a pump by means of which compressed air is guided into the sliding guide via a bearing gap.

A hydrostatic sliding guide denotes a guide (with a bearing) having an active lubricant circuit. The lubricant circuit is preferably maintained via a pump by means of which a lubricant, preferably oil, is guided under pressure into the sliding guide via a bearing gap.

In a preferred development, the sliding guide is designed as a dovetail guide.

The dovetail guide is a form-fitting, linear sliding guide.

In a preferred development, the transformer support includes a first (hydrostatic or aerostatic) sliding guide which allows a positional change of the transformer in a longitudinal direction (x direction) of the rail vehicle.

In a preferred development, the transformer support includes a second (hydrostatic or aerostatic) sliding guide which allows a positional change of the transformer transversely to the longitudinal direction (y direction) of the rail vehicle.

In a preferred development, the transformer support has a sliding shoe which is connected to the sliding guide on one side and to a flange plate of the transformer on the other side.

In a preferred development, the sliding guide of the transformer support is connected to the underframe of the rail vehicle by way of a welded bracket.

The arrangement according to the invention ensures that the transformer is steplessly displaceable after completed assembly or positioning in the rail vehicle and without removal of components.

This allows positional fine tunings of the transformer and thus in turn fine tunings of the center of gravity of the rail vehicle.

The arrangement according to the invention realizes an elegant possibility for the transformer in the installed state, in particular after completed weighing and after determining a center of gravity offset, to be adapted and optimized in its position until the determined center of gravity offset has been minimized or completely balanced out.

The arrangement according to the invention allows flexible center of gravity corrections on the rail vehicle at any time—not only during the first assembly of the rail vehicle but also after a certain operating period of the rail vehicle in a maintenance phase.

The arrangement according to the invention allows variations of equipment items of the rail vehicle and thus a project variety. If such equipment items are added to the rail vehicle or if they are removed from the rail vehicle, the position of the center of gravity of the rail vehicle is changed. This change in turn is reduced or compensated for by means of the arrangement according to the invention.

The present invention will be described in more detail below by way of example with reference to drawings, in which:

DETAILED DESCRIPTION OF THE INVENTION

Figure 1:
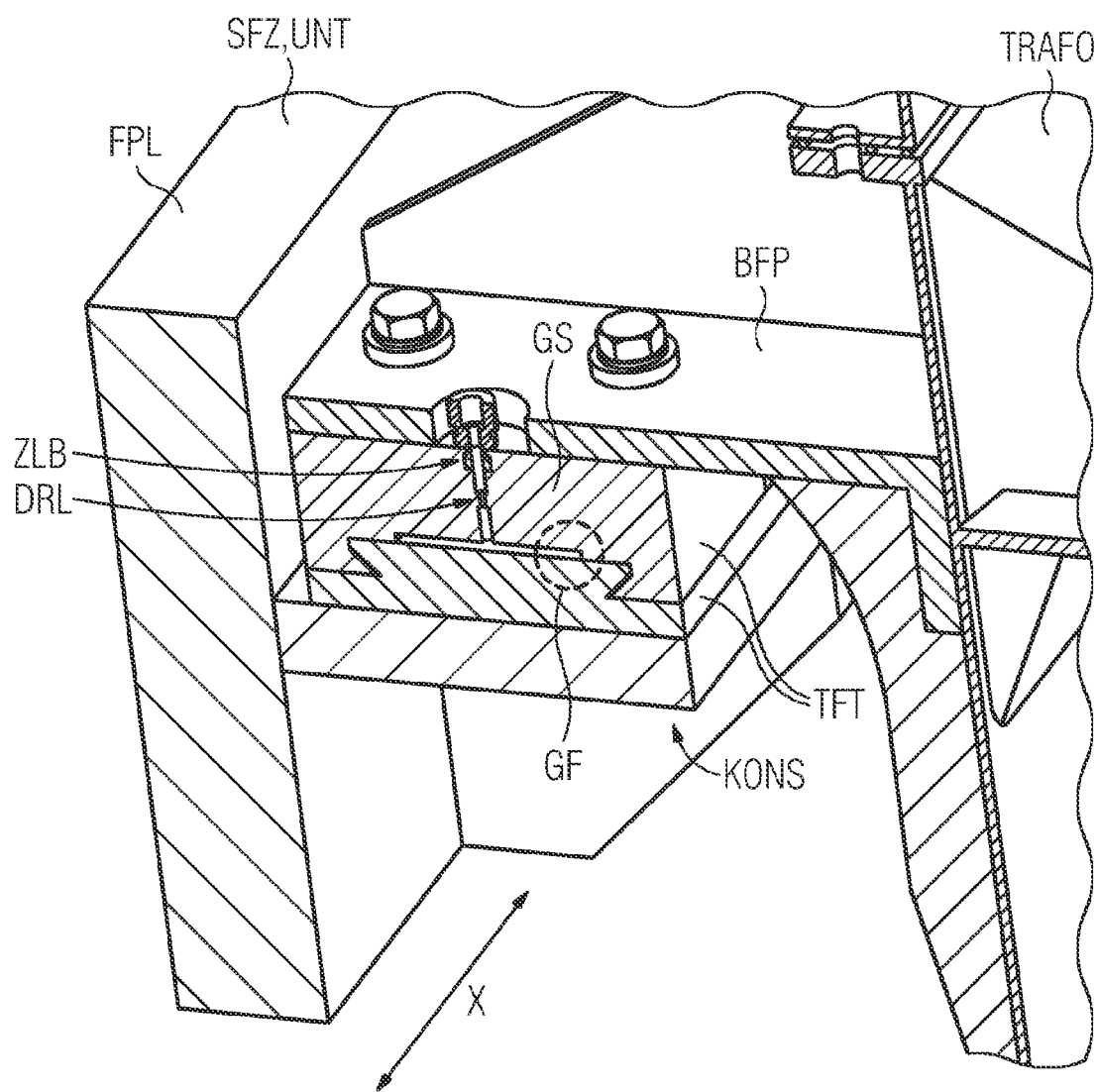
FIG. 1 shows key parts of the arrangement according to the invention in a side illustration.

FIG. 1 shows key parts of the arrangement according to the invention in a side illustration, with there here being shown by way of example only a displacement direction y for the position of the transformer TRAFO.

A rail vehicle SFZ or its underframe UNT is illustrated here by means of a constituent part, namely by means of a flange plate FPL which is used as a transformer transverse support.

The flange plate FPL defines a predetermined, rough position of the transformer TRAFO. The transformer TRAFO is connected to the flange plate FPL by way of a transformer support TFT.

The transformer support TFT includes a dovetail guide as sliding guide GF which is configured here as a hydrostatic sliding guide GF.

For the functionality of the hydrostatic sliding guide GF there are provided a central supply-line bore ZLB with oil connection and also a throttle DRL in the supply line.

The transformer support has a sliding shoe GS which is connected to the sliding guide GF on one side and to a fastening flange plate BFP of the transformer TRAFO on the other side.

The sliding guide GF of the transformer support TFT is connected by way of a welded bracket KONS to the flange plate FPL and thus to the underframe of the rail vehicle.

One embodiment-specific advantage lies in the fact that the transformer TRAFO lies in a defined and secure manner on the welded bracket KONS. This prevents the transformer TRAFO from falling down; it is thus as it were "captively" mounted.

FIG. 2 to FIG. 6 show the arrangement according to the invention in different views.

Figure 2:
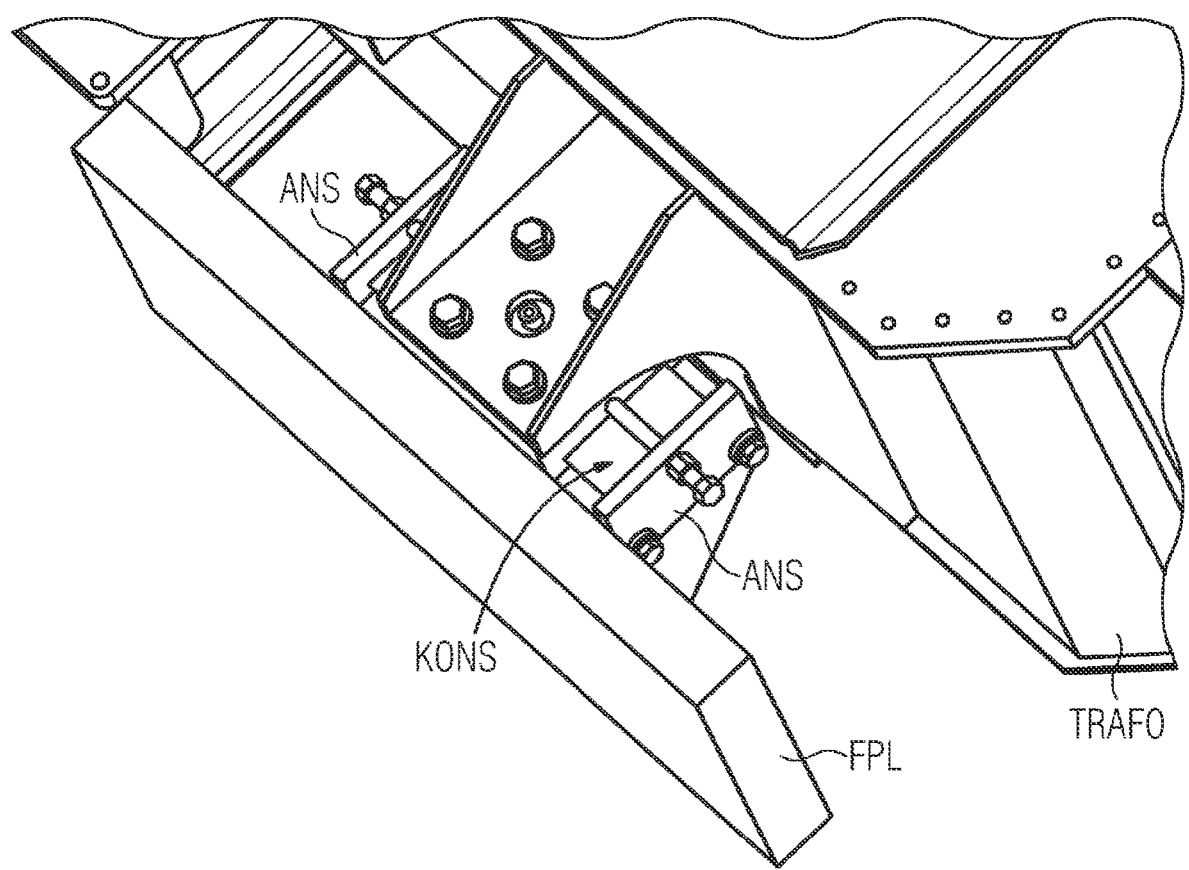
FIG. 2 to FIG. 6 show the arrangement according to the invention in different views.
Figure 3:
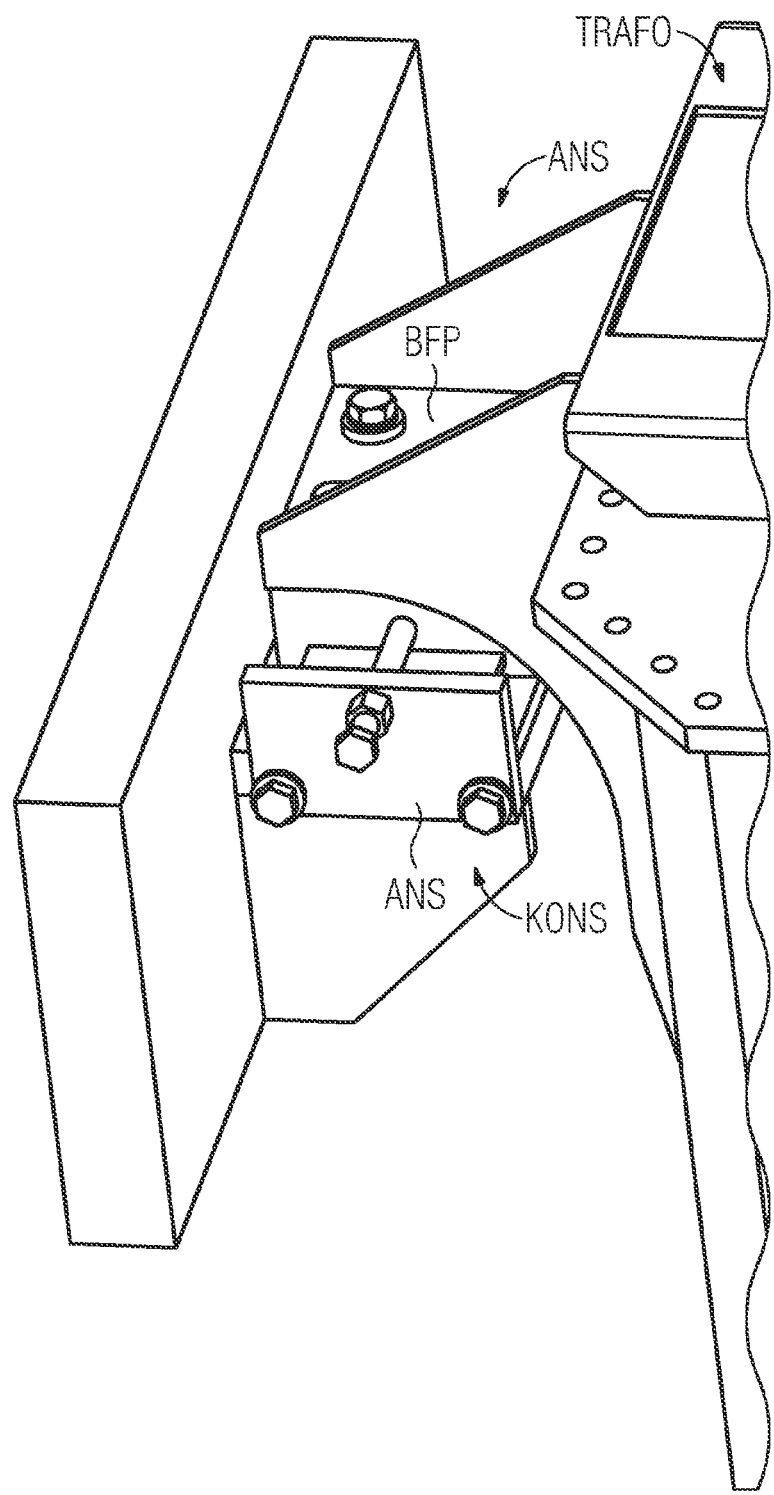
Figure 4:
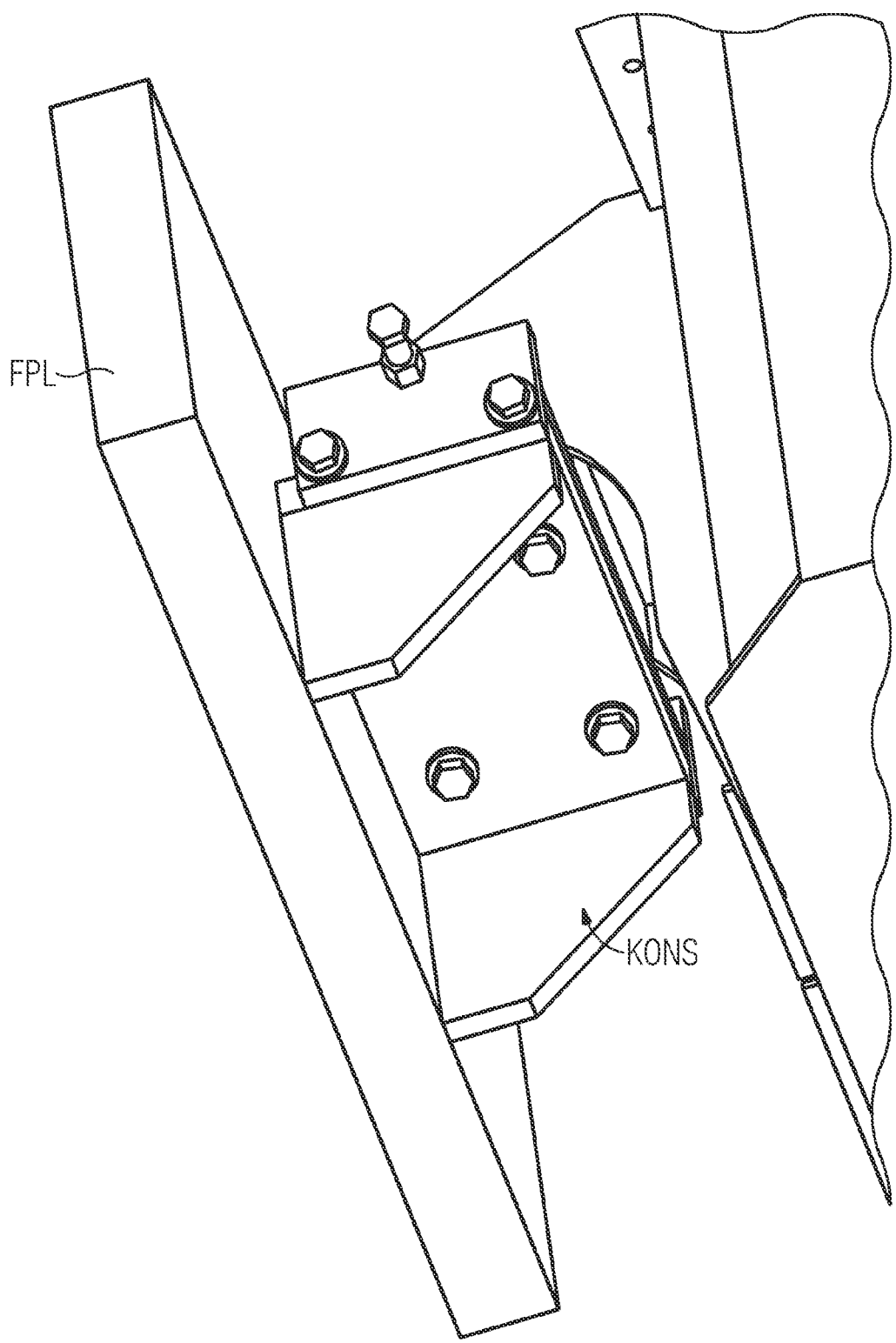
Figure 5:
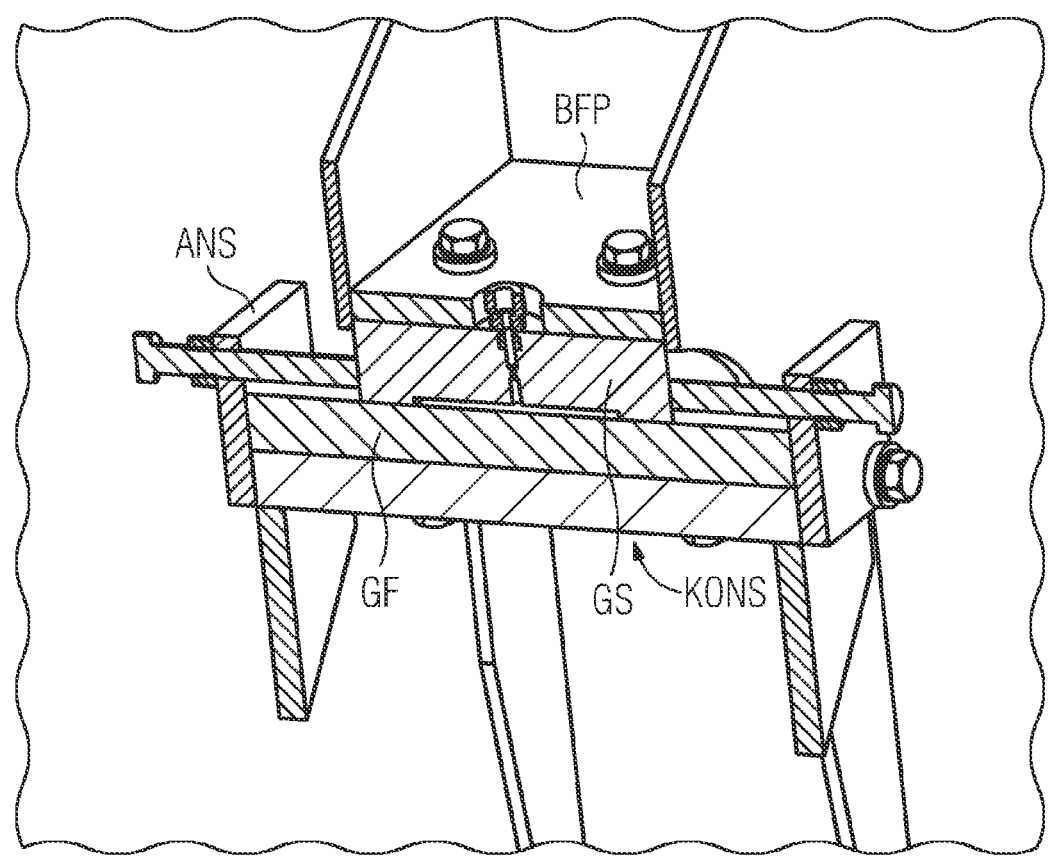
Figure 6:
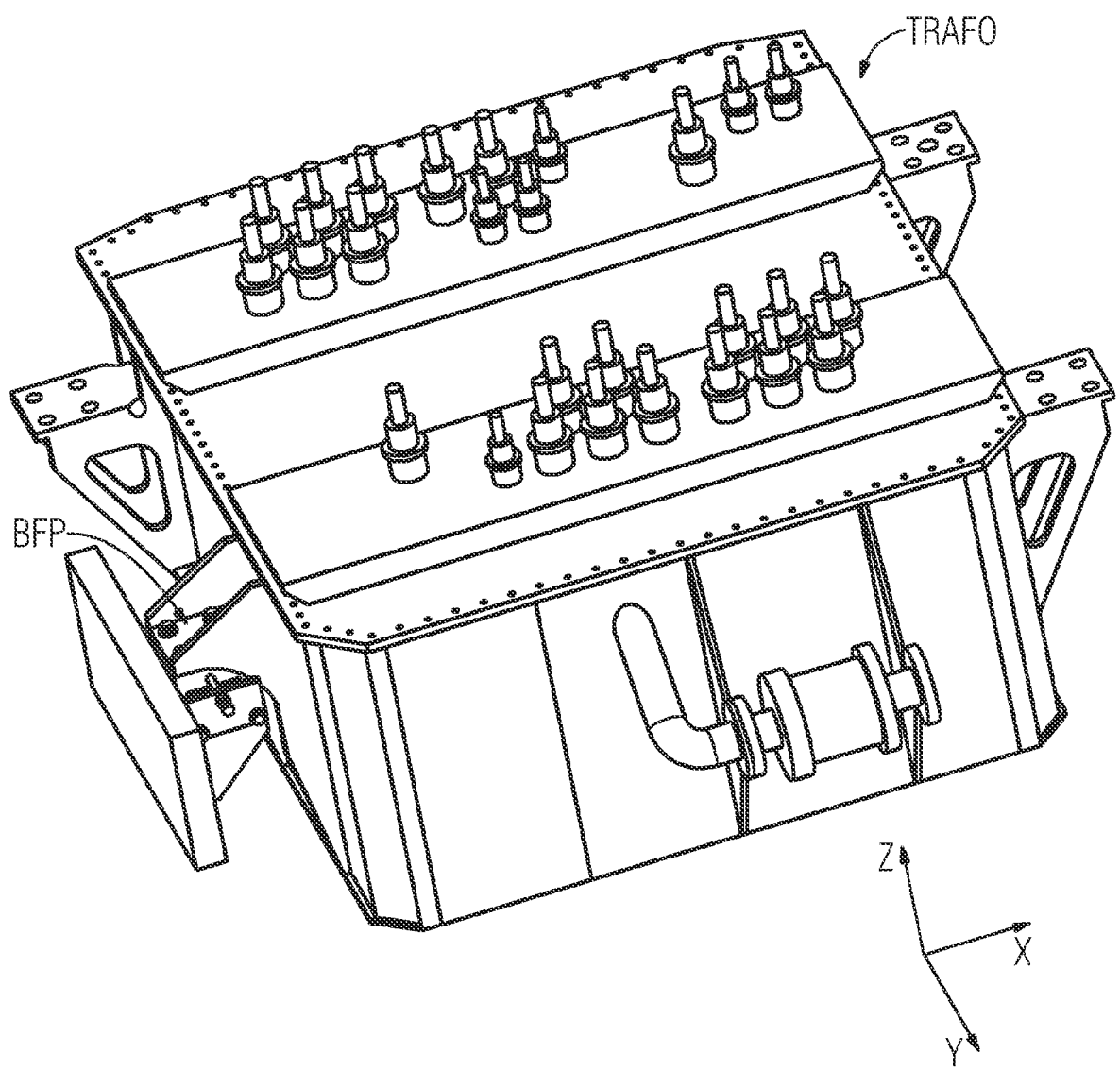

FIG. 2 additionally shows a stop ANS which can be flexibly adjusted on both sides and which here takes the form of plates which can be adjusted via threaded rods.

It is possible by means of the stop for the sliding guide GF (dovetail) to be fastened on the welded bracket KONS by a screw connection. The sliding guide GF is oriented exactly parallel by way of the screw connection in order to achieve a clean parallel guide.

To displace the transformer, the sliding guide GF is charged with oil pressure such that the transformer TRAFO can be displaced with minimized expenditure of force.

The displacement can be effected for example via further adjusting screws which are arranged on the end-side stop plates.

The invention claimed is:

1. A positioning arrangement, comprising:
   a transformer;
   a rail vehicle having an underframe;
   a transformer support arranged on said underframe of said rail vehicle and configured to fasten said transformer at a predetermined position in said rail vehicle;
   a guide connecting said transformer to said transformer support, said guide being a hydrostatic or aerostatic sliding guide configured to enable a positional change of said transformer relative to said underframe of said rail vehicle to be set by way of said guide, and said sliding guide having a fluid connection configured for introducing a pressurized fluid into a space formed between a fixed part and a sliding part of said sliding guide.

2. The arrangement according to claim 1, wherein said sliding guide is a linear guide.

3. The arrangement according to claim 2, wherein said sliding guide is a dovetail guide.

4. The arrangement according to claim 1, wherein:
   said transformer support includes a first sliding guide which allows a positional change of said transformer in a longitudinal direction of said rail vehicle, and/or
   said transformer support includes a second sliding guide which allows a positional change of said transformer transversely to a longitudinal direction of said rail vehicle.

5. The arrangement according to claim 1, wherein said transformer support has a sliding shoe connected to said sliding guide on one side and to a flange plate of said transformer on another side.

6. The arrangement according to claim 1, further comprising a welded bracket connecting said sliding guide of said transformer support to said underframe of said rail vehicle.

* * * * *